(12) United States Patent
Simmons

(10) Patent No.: US 9,754,133 B2
(45) Date of Patent: Sep. 5, 2017

(54) PROGRAMMABLE DEVICE PERSONALIZATION

(71) Applicant: Michael Simmons, Chandler, AZ (US)

(72) Inventor: Michael Simmons, Chandler, AZ (US)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 115 days.

(21) Appl. No.: 14/181,971

(22) Filed: Feb. 17, 2014

(65) Prior Publication Data

US 2015/0235057 A1    Aug. 20, 2015
US 2016/0085997 A9    Mar. 24, 2016

Related U.S. Application Data

(60) Provisional application No. 61/780,994, filed on Mar. 14, 2013.

(51) Int. Cl.
*G06F 21/79* (2013.01)
*G06F 21/44* (2013.01)
(Continued)

(52) U.S. Cl.
CPC .............. *G06F 21/79* (2013.01); *G06F 21/44* (2013.01); *G06F 21/73* (2013.01); *G06F 21/76* (2013.01)

(58) Field of Classification Search
CPC .......... G06F 21/79; G06F 21/78; G06F 21/76; G06F 21/73; G06F 21/44
See application file for complete search history.

(56) References Cited

U.S. PATENT DOCUMENTS 5,434,562 A * 7/1995 Reardon ............... G06F 21/567
                                                            713/193
5,446,864 A * 8/1995 Burghardt ........... G06F 12/1433
                                                            710/240

(Continued)

FOREIGN PATENT DOCUMENTS

EP          1303075 A1     4/2003  ............. G06F 12/00
EP          2506176 A1 * 10/2012

(Continued)

OTHER PUBLICATIONS

Holcomb, Daniel E. et al., "Power-Up SRAM State as an Identifying Fingerprint and Source of True Random Numbers," IEEE Transactions on Computers, vol. 58, No. 9, 13 pages, Sep. 1, 2009.

(Continued)

*Primary Examiner* — Yin-Chen Shaw
*Assistant Examiner* — Darshan Dhruv
(74) *Attorney, Agent, or Firm* — Slayden Grubert Beard PLLC

(57) ABSTRACT

A semiconductor device may include a secure memory configured to store a programmable key, an interface for programming the programmable key in the secure memory, and a plurality of configurable features of the semiconductor device that are associated with the programmable key, each configurable feature having a set of multiple selectable configurations, wherein a value of the key defines a selection of one of the multiple configurations for each of the configurable features. For example, the key may include multiple sub-keys, each associated with one of the configurable features, wherein a value of each sub-key defines a selection of one of the multiple configurations for the configurable feature associated with that sub-key. In addition, the full programmable key may enable an additional functionality of the semiconductor device.

27 Claims, 2 Drawing Sheets

(51) Int. Cl.
*G06F 21/73* (2013.01)
*G06F 21/76* (2013.01)

(56) References Cited

U.S. PATENT DOCUMENTS

| | | | | |
|---|---|---|---|---|
| 5,517,015 A | 5/1996 | Curry et al. | | 235/492 |
| 5,611,042 A * | 3/1997 | Lordi | | G06F 11/1032 |
| | | | | 714/6.1 |
| 5,812,848 A * | 9/1998 | Cohen | | G06F 8/54 |
| | | | | 719/331 |
| 6,005,814 A * | 12/1999 | Mulholland | | G01R 31/31701 |
| | | | | 365/189.05 |
| 6,122,704 A | 9/2000 | Hass et al. | | 711/100 |
| 6,480,948 B1 * | 11/2002 | Virajpet | | G06F 12/0638 |
| | | | | 711/202 |
| 6,496,971 B1 * | 12/2002 | Lesea | | G06F 17/5054 |
| | | | | 326/38 |
| 6,788,097 B1 * | 9/2004 | Jenkins, IV | | H03K 19/17744 |
| | | | | 326/14 |
| 6,931,543 B1 * | 8/2005 | Pang | | G06F 21/76 |
| | | | | 713/1 |
| 7,117,373 B1 * | 10/2006 | Trimberger | | G06F 21/76 |
| | | | | 326/39 |
| 7,200,235 B1 * | 4/2007 | Trimberger | | G06F 12/1425 |
| | | | | 326/38 |
| 7,366,306 B1 * | 4/2008 | Trimberger | | G06F 12/1425 |
| | | | | 326/8 |
| 7,681,043 B1 * | 3/2010 | Carr | | G11C 16/22 |
| | | | | 380/241 |
| 7,834,652 B1 * | 11/2010 | Tang | | G06F 21/76 |
| | | | | 326/38 |
| 8,024,579 B2 * | 9/2011 | Challener | | G06F 21/51 |
| | | | | 713/168 |
| 8,339,804 B2 * | 12/2012 | Crabtree | | H04L 45/00 |
| | | | | 361/748 |
| 8,555,015 B2 * | 10/2013 | Muchsel | | G06F 21/71 |
| | | | | 711/163 |
| 8,555,032 B2 * | 10/2013 | Snyder | | G06F 1/08 |
| | | | | 712/15 |
| 2003/0229798 A1 * | 12/2003 | Dastidar et al. | | 713/193 |
| 2006/0253762 A1 * | 11/2006 | Schalick | | G01R 31/31704 |
| | | | | 714/742 |
| 2008/0019503 A1 * | 1/2008 | Dupaquis | | H04L 9/0625 |
| | | | | 380/28 |
| 2009/0070596 A1 * | 3/2009 | Mantin | | G06F 21/55 |
| | | | | 713/189 |
| 2011/0154061 A1 * | 6/2011 | Chilukuri | | G06F 12/1408 |
| | | | | 713/193 |
| 2012/0060039 A1 * | 3/2012 | Leclercq | | G06F 21/10 |
| | | | | 713/189 |
| 2013/0145176 A1 * | 6/2013 | Dellow | | G06F 21/70 |
| | | | | 713/189 |

FOREIGN PATENT DOCUMENTS

| | | | | |
|---|---|---|---|---|
| NL | EP 2506176 A1 * | 10/2012 | | G06F 21/72 |
| WO | WO0201328 A2 * | 1/2002 | | |
| WO | WO2002001328 A2 * | 1/2002 | | G06F 1/00 |

OTHER PUBLICATIONS

International Search Report and Written Opinion, Application No. PCT/US2014/019316, 9 pages, May 21, 2014.

* cited by examiner

PROGRAMMABLE DEVICE PERSONALIZATION

This application claims the benefit of U.S. Provisional Application No. 61/780,994 filed on Mar. 14, 2013, which is incorporated herein in its entirety.

TECHNICAL FIELD

The present disclosure relates to a programmable device personalization, in particular for semiconductor devices.

BACKGROUND

One security concern of customers today is protection against replication of a product. For example, in an automotive key fob, part of the security of the system relies on the fact that the actual application specific integrated circuit (ASIC) or system on a chip (SoC) is unique for the customer. This means a semiconductor manufacturer must produce a new mask set with some different underlying characteristics (memory map, pinout, functions, etc.) than that of the corresponding general purpose device mask set.

SUMMARY

According to various embodiments, a programmable device personalization can be provided which provides for a scheme to allow end customers to create unique devices from general purpose products.

For example, one embodiment provides a semiconductor device may include a secure memory configured to store a programmable key, also referred to herein as a "device personalization key," an interface for programming the programmable key in the secure memory, and a plurality of configurable features of the semiconductor device that are associated with the programmable key, each configurable feature having a set of multiple selectable configurations, wherein a value of the key defines a selection of one of the multiple configurations for each of the configurable features. For example, the key may include multiple sub-keys, each associated with one of the configurable features, wherein a value of each sub-key defines a selection of one of the multiple configurations for the configurable feature associated with that sub-key. In addition, the full programmable key may enable an additional functionality of the semiconductor device.

Another embodiment provides a method for configuring a semiconductor device having an accessible memory, a secure memory, a configuration interface, and a plurality of configurable features, each configurable feature having a set of multiple selectable configurations. The method may include programming a key into the secure memory using the configuration interface provided on the semiconductor device, wherein a value of the key defines a selection of one of the multiple configurations for each of the configurable features.

Thus, according to various embodiments, a programmable "device personalization key" can be built into a general purpose device. In a situation in which a semiconductor device manufacturer supplies devices to multiple customers, each customer can have a unique device based on the device personalization key programmed into the respective device, either by the manufacturer, by the customer itself, or by another party. As mentioned above, each programmable key may include multiple sub-keys (each sub-key comprising a sub-set of bits of the full key), with each sub-key being used to configure a particular aspect or feature of the device, such as a memory map for a device memory, a test entry code, an identify or availability of a peripheral set, a pinout configuration, an interrupt vector table location, program address scrambling/mapping configurations, etc. Each configurable feature of the device may have multiple different possible configurations, and value of each sub-key may define the selection of a particular one of the multiple possible configurations for the configurable feature associated with that configurable feature.

In some embodiments, the decoding of these sub-keys may be designed such that multiple values of each sub-key (or at least some sub-keys) will result in the feature selection. For example, for the test entry code sub-key, values 1, 3, 7 may result in test entry code 'A', while values 2, 5 result in test entry code 'B', and values 4, 6 result in test entry code 'C'. This increases the difficultly to reverse engineer a device personalization key in the event that the feature set of the device (i.e., the selected configurations for the various configurable features) can itself be reverse engineered. For example, with reference to the example above, knowledge that a particular device is using test entry code 'A' instead of 'B' or 'C' does not indicate the exact test entry code sub-key value of the device personalization key, but rather only the possible set of sub-keys values on the device corresponding to that test entry code (e.g., knowledge that the device is using test entry code 'A' indicates only that the entry code sub-key value is 1, 3, or 7. A particular advantage of this scheme, for further deterring copying or reverse engineering of a device, is understood in view of the additional device feature enabled by the full device personalization key, as discussed below.

In some embodiments, the full device personalization key can be used to compute an additional value, or "sub-key," that can be used to configure or personalize an additional feature, such as program address scrambling/mapping, for example. In some embodiments, an existing CRC peripheral or a hash function could be used to generate a code number from a long device personalization key. Thus, for a particular device, even if one were to determine a suitable sub-key to correctly configure each sub-feature of the device, the additional feature enabled by the full device personalization key cannot be provided without exact knowledge of the full device personalization key.

In some embodiments, the device is designed to allow the key to be programmed by either the manufacturer or by the customer itself. Allowing the customer to program its own key provides the additional benefit of placing the entire supply chain in the hands of the customer themselves. That is, it becomes impossible for the manufacturer to sell a first customer's "custom" device to a second customer, as the manufacturer does not know the device personalization key used by the first customer. Alternatively, programming the key by the manufacturer allows the manufacturer to provide personalized devices without having to form multiple masks per product, as in conventional personalization schemes. In other words, personalization can be done after the device is packaged.

In some embodiments, according to the inventive features discussed above, in order to clone a product, one must possess the original program code (or image), the knowledge of which general purpose part is being used, and the exact and full device personalization key.

Thus, a device and method are available according to various embodiments that provide device personalization services to a broader customer base for a lower cost.

BRIEF DESCRIPTION OF THE FIGURES

Example embodiments are discussed below with reference to the drawings, in which.

DETAILED DESCRIPTION

Figure 1:
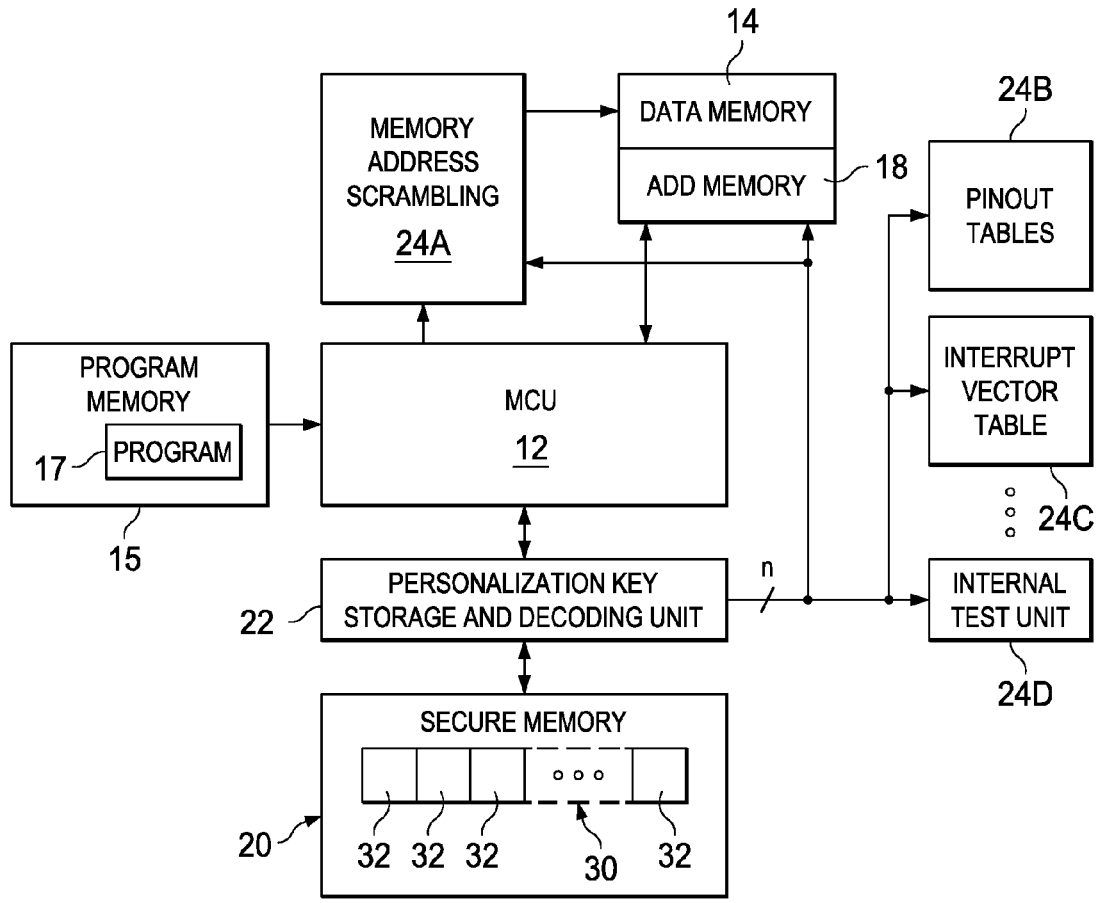
FIG. 1 shows a block diagram of an example semiconductor device, e.g., microcontroller, which can be personalized using a device personalization key, according to various embodiments.

FIG. 1 shows a block diagram of an example semiconductor device 10, e.g., microcontroller, which can be personalized according to various features of the present disclosure. Device 10 may include a processor 12, a data memory 14, a program memory 16 storing one or more programs 17 for providing various functionality of device 10, an optional additional memory 18, and a secure memory 20, a personalization key storage and decoding unit 22, and a number of configurable features 24. In this example, configurable features 24 include a configurable memory address scrambler 24A, pinout tables 24B, interrupt vector table(s) 24C, and an internal test unit 24D, for example. Secure memory 20 may store a device personalization key 30 that includes a plurality of sub-keys 32. Device personalization key 30 may include any suitable number of sub-keys 32.

Processor 12 may, for example, be a processor core MCU which has access to data memory 14 through the configurable memory address scrambler 24A, which performs address scrambling according to one or more methods defined by one of the sub-keys 32 of the device personalization key 30 stored in secure memory 20. In some embodiments, additional data memory 16, which typically is not accessible in a general purpose device, can be activated by one of the sub-keys 32. In addition to the memory address scrambler 24A, various other configurable features 24 of the microcontroller 10 may be defined by the personalization key 30, such as the configuration of a specific pinout (defined by pinout tables 24B), address(es) of interrupt vector tables) 24C, internal test entry sequences defined by internal test unit 24D, and other configurable functions as explained above.

Data memory 14, program memory 16, additional memory 18, and secure memory 20 may be formed as discrete memory structures, or any two or more (or all) of such memories may comprise specified areas of an integrated memory structure. For example, secure memory 20 may be a physically distinct memory structure from data memory 14, additional memory 16, and/or program memory 16, or may comprise an assigned area of an integrated memory device.

Personalization key storage and decoding unit 22 may provide an interface for, or otherwise facilitate, writing key 30 into secure memory 20 (i.e., programming the key into secure memory 20), and may also be configured to decode key 30. In some embodiments, the decoding may be performed by simple logic, such as comparators, as multiple sub-key values may be assigned to the same function configuration, e.g., as discussed below regarding FIG. 3.

Thus, customer-specific devices 10 can be produced by merely programming the personalization key 30 with a unique code. Such devices can otherwise be produced as a single version. According to some embodiments, at end of a manufacturing line, such device may be provided with different device numbers on the housing of the device or optionally with no markings at all. However, they could also simply comprise the same markings as a general purpose device. Thus, it would be unknown to a third person that the device is actually differently configured than a general purpose device.

Figure 4:
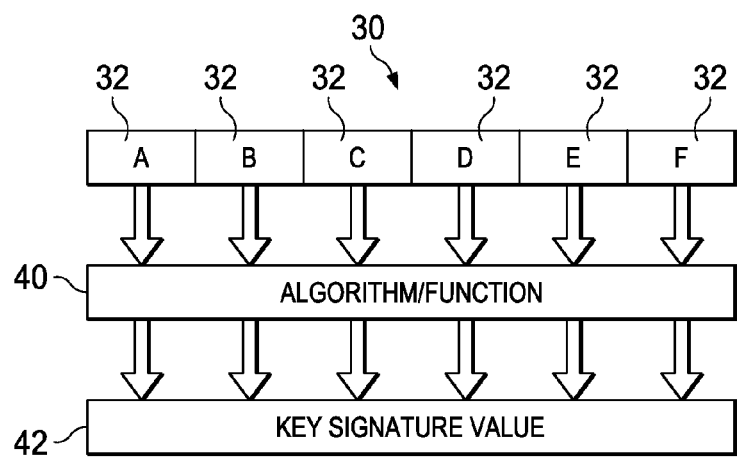
FIG. 4 illustrates the generation of a "signature" value from the programmable key, which may be used to enable or configure another feature of the personalized device.
Figure 2:
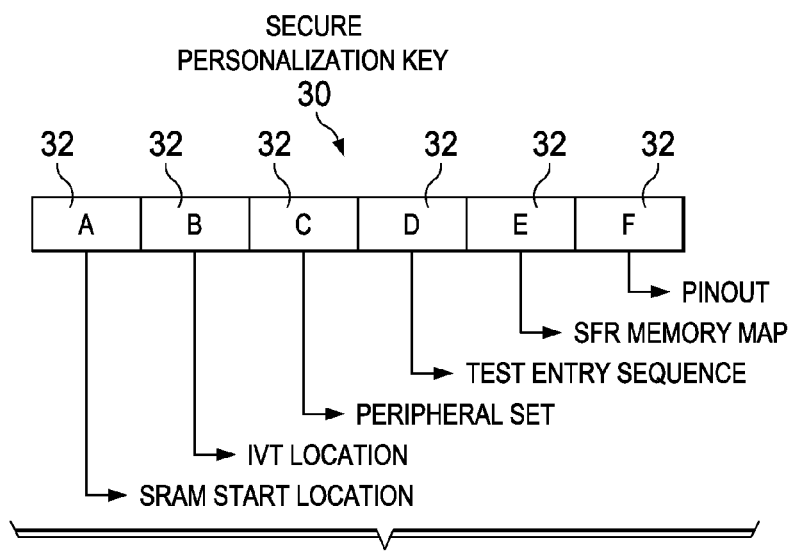
FIG. 2 shows an example n-bit programmable key, having multiple sub-keys, that can be programmed into the device of FIG. 1, according to an example embodiment.
Figure 3:
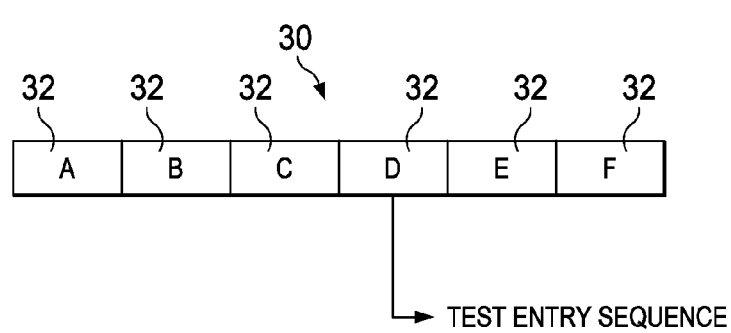
FIG. 3 illustrates the concept of assigning multiple sub-key values to each selectable configuration for a particular configurable feature.

FIGS. 2-4 illustrate various aspects of the device personalization key 30, according to certain embodiments.

FIG. 2 shows an example of an n-bit programmable key 30 that can be programmed into device 10, for example into an associated register of secure memory 20. Secure memory 20 may be provided which provides for non-volatile storage of the key which cannot be read by a user. In some embodiments, memory 20 is configured such that it can be written to only once and is inaccessible a user will have no access to this memory once it is programmed.

As shown, the personalization key 30 may include several "sub-keys" 32. In this example, key 30 includes six sub-keys 32, labeled A-F. However, key 30 may include any other suitable number of sub-keys 32. Further, each sub-key 32 of a key 30 may have any suitable length (e.g., number of bits). Further, the sub-keys 32 of a particular key 30 may have the same length or different lengths. Each sub-key 32 may be assigned to a particular configurable features or aspect of the device 10. In the example shown in FIG. 2, sub-keys A-F are assigned to the following six configurable aspects of the device 10: (A) the start location of an SRAM (static random-access memory) area, e.g., within data memory 14; (B) the address of an interrupt vector table 24C, e.g., within program memory 16; (C) the availability or enabled state of a peripheral set associated with the device 10; (D) an internal test entry sequence (e.g., as defined by internal test unit 24D); (E) an SFR (special function register) memory map (e.g., utilized by memory address scrambler 24A; and (F) a pinout configuration (e.g., as defined by pinout tables 24B).

Each of such configurable features may have multiple different possible configurations. Each sub-key A-F has a n-bit value that defines the selection of a particular one of the multiple possible configurations for the corresponding configurable feature. For example, the value of sub-key D may define a particular test entry sequence selected from three different possible test entry sequences. As another example, the value of sub-key F may define a particular pinout configuration selected from six possible pinout configurations.

Thus, various configurations or functionalities of the device 10 can be defined in various ways using the multiple sub-keys 32. For example, a configurable programmable pin assignment (defined by sub-key F) may allow to assign external pins of a semiconductor device 10, for example a microcontroller, to be connected to a specific peripheral device. Without the correct code, this function may not be activated rendering the device inoperable when using copied firmware.

Each configurable feature may have any suitable number of possible selectable configurations. Further, each sub-key may have any suitable length (in bits), thus allowing for any number of possible values. In one example embodiment, a sub-key 32 may be 4 bits long, thus defining 16 possible values.

In some embodiments, each sub-key may have more possible values than possible selectable configurations for the associated configurable feature, thus allowing the assignment of multiple sub-key values to each selectable configuration for the feature, which may provide additional protection against copying or reverse engineering the device.

For example, FIG. 3 highlights sub-key "D" corresponding to the configurable test entry sequence. The test entry sequence may have four selectable sequences, Sequence #1, Sequence #2, Sequence #3, and Sequence #4. Sub-key D may have a 4-bit value, thus defining 16 possible sub-key values. Thus, as shown, four different 4-bit sub-key values are mapped to each of the four sequences.

This mapping arrangement may help prevent reverse-engineering of key 30 from knowledge of feature sets/configurations. Moreover, figuring out the configured test entry sequence (e.g., Sequence #3) may only indicate of one possible sub-key value (out of the four sub-key values assigned to Sequence #3), which may not be the correct value key (e.g., the Sequence #3 sub-value "1000" may be identified, while the actual Sequence #3 sub-key value in the key 30 is "1010"). This incorrect identification may prevent a copier from accessing a function that is enabled only by the full, correct key 30, as explained below with reference to FIG. 4

Internally, the sub-key decoding provided by decoding unit 22 merely needs simple logic, such as comparators, as multiple sub-key values may be assigned to the same function configuration. If each sub-key value generates a unique function configuration, then a simple decoder can be used. A general purpose device may comprise this additional personalization feature and a predefined key 30 may be stored. In addition, device 10 may include logic that prevents accidental programming of the key 30. Thus, device 10 may include a specific programming sequence to allow a one-time-only programming of the key 30 to prevent accidental overwriting, e.g., for users that do not need this functionality.

Moreover, in some embodiments, the functionality may not be documented for general purpose devices. Only customers that require this functionality would be provided with the associated personalization function. For example, in embodiments where the manufacturer programs the key 30 individually for a customer, a dedicated data sheet may be provided for this customer that explains the specific functions as set by the specific key 30. However, a more complex data sheet could be provided that explains the various setting that respective keys would generate.

As discussed above, in some embodiments, the full device personalization key 30 can be used to compute an additional value, or "signature," to enable, configure, or personalize a particular feature or function of device 10. FIG. 4 illustrates an example of this aspect. As shown, an algorithm or function 40 can be applied to the full personalization key 30 (including all sub-keys) to generate a key signature value 42 that may be used to enable, configure, or personalize a particular feature of the device 10. For example, the key signature value 42 may define a selection of a configurable feature, in a similar manner as each sub-key 24. Alternatively, the key signature value 42 itself may be used to provide a function. For instance, the key signature value 42 itself may be used as an encryption key, e.g., for internal device communications or for communications with external devices.

The algorithm or function 40 may include any algorithm or function to transform or convert the key 30 into a key signature value 42. For example, a cyclic redundancy check (CRC), or a one-way function such as a hash function, could be used to generate a code number (key signature value 42) from a long device personalization key 30.

Thus, in order to enable, configure, or personalize a particular feature or function of device 10, the full exact key 30, including all sub-keys 24, must be known. Thus, for a particular device, even if one were to determine a suitable sub-key to correctly configure each feature of the device, the additional feature enabled or configured by the full device personalization key 30 (e.g., by the key signature value 42 generated from the full key 30) cannot be provided without exact knowledge of the full device personalization key 30.

In other embodiments, the key signature value 42 may be generated based on multiple sub-keys 24 of a key, but less than the entire key 30. For example, the key signature value 42 may be generated based on a subset of the sub-key values, or based on a portion of every sub-key value.

Thus, according to the above, in some embodiments, in order to clone a product, one must possess the original program code (or image), the knowledge of which general purpose part is being used, and the exact and full device personalization key.

For decoding the personalization key 30, any encryption key procedure may be used, according to various embodiments. The disclosed method allows the addition of device personalization to any semiconductor device that comprises a programming interface, without the need to apply a different mask set during manufacturing. Separate personalization key storage ensures that if a customer's program code is copied, and someone knows which manufacturer device is being used, they can not clone the device without significant effort. In some embodiments, a base approach for the manufacturer could be to program a personalization key, and then give out a custom datasheet to match the device as stated above. An extended approach in other embodiments is to allow the customer to program their own personalization key, which allows the customer to have total control over their own supply chain. The customer may inform the manufacturer of a set of desired configuration for various device features (e.g., a desired set of features, desired memory map, desired pinout, etc.) and the manufacturer may then provide a list of sub-key value corresponding to the selected configuration for each feature (as each configuration may have multiple assigned sub-key values, as discussed above regarding FIG. 3). The customer may then assembles a personalization key from any of these sub-key values, and program the resulting key into their device, thereby giving the customer a personalization key that is unknown to the manufacturer.

Although the disclosed embodiments are described in detail in the present disclosure, it should be understood that various changes, substitutions and alterations can be made to the embodiments without departing from their spirit and scope.

The invention claimed is:

1. A semiconductor device, wherein the semiconductor is configured to operate in a general purpose mode in which its operation is identical to a generic commercially available semiconductor device and is further configurable to operate in a second mode different from said general purpose mode and wherein the semiconductor device comprises:
   a secure memory configured to store a programmable key, the secure memory inaccessible to read operations external to the semiconductor device;
   a programming interface for programming the programmable key in the secure memory;

a plurality of configurable features of the semiconductor device that are associated with the programmable key, each configurable feature having a set of multiple selectable configurations;
wherein:
when said programmable key is programmed, the semiconductor device operates in the second mode wherein a value of the programmable key defines a selection of one of the multiple configurations for each of the configurable features;
the programmable key comprises a plurality of sub-keys, wherein each sub-key includes information defining one of the plurality of configurable features, the configurable features comprises at least a pinout, a peripheral set availability and other settings of the semiconductor device;
a value of each sub-key defines a selection of one of the multiple configurations for the configurable feature associated with said each sub-key;
in the general purpose mode, the semiconductor device has a predefined pinout configuration;
in the second mode, when an associated sub-key of the programmable key for defining a pinout configuration is programmed, the semiconductor device has pinout configuration which is different from said predefined pinout configuration, the pinout configurations defining assignment of external pins in the semiconductor device for communication of a microcontroller to a peripheral device;
in the general purpose mode, communication operation of the semiconductor device having the predefined pinout configuration with external devices is identical to another commercially available semiconductor device;
in the second mode, communication operation of the semiconductor device having a particular pinout configuration with the external devices is different from the general purpose mode according to the value of the programmable key utilized as an encryption key.

2. The semiconductor device according to claim 1, wherein a programmed programmable key enables an additional functionality of the semiconductor device.

3. The semiconductor device according to claim 2, wherein the additional functionality of the semiconductor device is enabled by a value resulting from an application of a logical algorithm to the full programmable key.

4. The semiconductor device according to claim 3, wherein the logical algorithm comprises a cyclic redundancy check or a hash function.

5. The semiconductor device according to claim 2, wherein the additional functionality which is enabled by a programmed programmable key is a memory address or code scrambling function.

6. The semiconductor device according to claim 1, comprising electronics that allow the programmable key to be programmed only once.

7. The semiconductor device according to claim 6, comprising an access device for writing said key and configured to prevent accidental overwriting of the key.

8. The semiconductor device according to claim 1, with the programmable key programmed and stored in the secure memory.

9. A method for configuring a semiconductor device having an accessible memory, a secure memory, a configuration interface, and a plurality of configurable features, each configurable feature having a set of multiple selectable configurations, wherein the semiconductor is configured to operate in a general purpose mode in which its operation is identical to a generic commercially available semiconductor device and is further configurable to operate in a second mode different from said general purpose mode, the method comprising:
programming a key into the secure memory using the configuration interface provided on the semiconductor device, wherein after programming the key, the semiconductor device operates in said second mode; wherein the programmable key comprises a plurality of sub-keys, wherein each sub-key defines one of the plurality of configurable features, the features comprising at least a pinout, a peripheral set availability and other settings of the semiconductor device;
causing the semiconductor device to operate differently than in the general purpose mode by selecting, through a value of the key, defining one of the multiple configurations for each of the configurable features;
selecting one of the multiple configurations for a given configurable feature associated with said each sub-key by defining value of each sub-key;
applying, in the general purpose mode, a predefined pinout configuration to the semiconductor device;
applying, in the second mode, another pinout configuration to the semiconductor device that is different from the predefined pinout configuration, based upon an associated sub-key of the programmable key for defining the other pinout configuration, wherein the pinout configurations defines assignment of external pins in the semiconductor device for communication of a microcontroller to a peripheral device;
operating, in the general purpose mode, the semiconductor device having the predefined pinout configuration to communicate with external devices in a manner identical to another, commercially available semiconductor device;
operating, in the second mode, the semiconductor device having a particular pinout configuration to communicate with the external devices utilizing the value of the programmable key as an encryption key.

10. The method according to claim 9, wherein the full key enables an additional functionality of the semiconductor device.

11. The method according to claim 10, comprising applying a logical algorithm to the full key to generate a value that enables the additional functionality of the semiconductor device.

12. The method according to claim 11, wherein the logical algorithm comprises a cyclic redundancy check or a hash function.

13. The method according to claim 10, wherein the additional functionality full enabled by the full key is a memory address or code scrambling function.

14. The method according to claim 9, wherein the device prevents the key from being programmed more than once.

15. The method according to claim 9, wherein the device prevents the key from being programmed more than once by using an access device for writing the key and preventing an accidental overwriting of the key.

16. The method according to claim 9, wherein in the general purpose mode, the semiconductor device has a predefined memory mapping of a memory of the semiconductor device and wherein when an associated sub-key of the programmable key for defining a memory mapping is programmed, the semiconductor device has memory mapping which is different from said predefined memory mapping.

17. The method according to claim 9, wherein in the general purpose mode, the semiconductor device has a predefined test entry sequence of the semiconductor device and wherein when an associated sub-key of the programmable key for defining a test entry sequence is programmed, the semiconductor device has a test entry sequence which is different from said predefined test entry sequence.

18. The method according to claim 9, wherein in the general purpose mode, the semiconductor device has a predefined peripheral set availability of the semiconductor device and wherein when an associated sub-key of the programmable key for defining the peripheral set availability is programmed, the semiconductor device has the peripheral set availability which is different from said predefined peripheral set availability.

19. The method according to claim 9, wherein in the general purpose mode, the semiconductor device has a predefined interrupt vector table location and wherein when an associated sub-key of the programmable key for defining an interrupt vector table location is programmed, the semiconductor device has an interrupt vector table location which is different from said predefined interrupt vector table location.

20. The method according to claim 9, wherein in the general purpose mode, the semiconductor device has a predefined SRAM start location and wherein when an associated sub-key of the programmable key for defining an SRAM start location is programmed, the semiconductor device has an SRAM start location which is different from said predefined an SRAM start location.

21. The semiconductor device according to claim 1, wherein in the general purpose mode, the semiconductor device has a predefined memory mapping of a memory of the semiconductor device and wherein when an associated sub-key of the programmable key for defining a memory mapping is programmed, the semiconductor device has memory mapping which is different from said predefined memory mapping.

22. The semiconductor device according to claim 1, wherein in the general purpose mode, the semiconductor device has a predefined test entry sequence of the semiconductor device and wherein when an associated sub-key of the programmable key for defining a test entry sequence is programmed, the semiconductor device has a test entry sequence which is different from said predefined test entry sequence.

23. The semiconductor device according to claim 1, wherein in the general purpose mode, the semiconductor device has a predefined peripheral set availability of the semiconductor device and wherein when an associated sub-key of the programmable key for defining the peripheral set availability is programmed, the semiconductor device has the peripheral set availability which is different from said predefined peripheral set availability.

24. The semiconductor device according to claim 1, wherein in the general purpose mode, the semiconductor device has a predefined interrupt vector table location and wherein when an associated sub-key of the programmable key for defining an interrupt vector table location is programmed, the semiconductor device has an interrupt vector table location which is different from said predefined interrupt vector table location.

25. The semiconductor device according to claim 1, wherein in the general purpose mode, the semiconductor device has a predefined SRAM start location and wherein when an associated sub-key of the programmable key for defining an SRAM start location is programmed, the semiconductor device has an SRAM start location which is different from said predefined an SRAM start location.

26. The semiconductor device according to claim 1, wherein in the general purpose mode, the semiconductor device has a predefined pinout configuration and wherein when an associated sub-key of the programmable key for defining a pinout configuration is programmed, the semiconductor device has pinout configuration which is different from said predefined pinout configuration.

27. The method according to claim 9, wherein in the general purpose mode, the semiconductor device has a predefined pinout configuration and wherein when an associated sub-key of the programmable key for defining a pinout configuration is programmed, the semiconductor device has a pinout configuration which is different from said predefined pinout configuration.

* * * * *